United States Patent
De Baere

(10) Patent No.: US 11,419,271 B2
(45) Date of Patent: Aug. 23, 2022

(54) AGRICULTURAL BALER WITH INDEPENDENT TENSIONING ARMS

(71) Applicant: CNH Industrial America LLC, New Holland, PA (US)

(72) Inventor: Freek De Baere, Maldegem (BE)

(73) Assignee: CNH Industrial America LLC, New Holland, PA (US)

( * ) Notice: Subject to any disclaimer, the term of this patent is extended or adjusted under 35 U.S.C. 154(b) by 145 days.

(21) Appl. No.: 16/741,247

(22) Filed: Jan. 13, 2020

(65) Prior Publication Data
US 2021/0212261 A1    Jul. 15, 2021

(51) Int. Cl.
A01F 15/07    (2006.01)
A01F 15/18    (2006.01)

(52) U.S. Cl.
CPC .............. *A01F 15/07* (2013.01); *A01F 15/18* (2013.01); *A01F 2015/077* (2013.01); *A01F 2015/0795* (2013.01)

(58) Field of Classification Search
CPC ...... A01F 15/07; A01F 15/0705; A01F 15/08; A01F 15/085; A01F 15/0833; A01F 15/18; A01F 2015/077; A01F 2015/0795
USPC .......................................................... 100/88
See application file for complete search history.

(56) References Cited

U.S. PATENT DOCUMENTS

| | | |
|---|---|---|
| 4,077,315 A | 3/1978 | Meiers |
| 4,150,527 A | 4/1979 | Meiers |
| 4,702,066 A | 10/1987 | Newendorp et al. |
| 4,759,279 A | 7/1988 | Frerich |
| 5,228,280 A * | 7/1993 | Ratzlaff ................. A01F 15/07 100/88 |
| 5,931,089 A | 8/1999 | Viesselmann et al. |
| 6,029,434 A * | 2/2000 | Ratzlaff ................. A01F 15/07 100/88 |
| 6,094,900 A | 8/2000 | Underhill et al. |
| 6,729,118 B2 * | 5/2004 | Viaud ................ A01F 15/0705 100/88 |
| 9,622,419 B2 | 4/2017 | Simmons et al. |
| 9,936,644 B2 | 4/2018 | Pouchet et al. |
| 2005/0235843 A1 * | 10/2005 | Viaud ................ A01F 15/0833 100/89 |
| 2013/0298787 A1 | 11/2013 | Simmons et al. |

(Continued)

FOREIGN PATENT DOCUMENTS

EP    0238386 A1    9/1987

OTHER PUBLICATIONS

Extended European Search Report for EP Application No. 21151267.8 dated Jun. 2, 2021 (six pages).

*Primary Examiner* — Jimmy T Nguyen
(74) *Attorney, Agent, or Firm* — Peter Zacharias; Patrick Sheldrake

(57) ABSTRACT

A bale chamber for an agricultural baler includes a plurality of rolls; a plurality of belts wrapped around the rolls; a movable serpentine arm in contact with the belts and configured to move responsively to lifting by at least one of the belts; and a plurality of tensioning arms, each of the tensioning arms being forced against a respective one of the belts and independently movable relative to the other tensioning arms. Each tensioning arm is configured to move against and reduce slack in its respective belt as the serpentine arm moves out of contact with its respective belt.

14 Claims, 7 Drawing Sheets

(56) References Cited

U.S. PATENT DOCUMENTS

2013/0305937 A1\* 11/2013 Roberge ................ A01D 41/12
100/40

\* cited by examiner

AGRICULTURAL BALER WITH INDEPENDENT TENSIONING ARMS

BACKGROUND OF THE INVENTION

The present invention pertains to agricultural balers and, more specifically, to agricultural balers with tensioning arms.

Agricultural harvesting machines, such as balers, are used to consolidate and package crop material so as to facilitate the storage and handling of the crop material for later use. In the case of hay, a mower-conditioner is typically used to cut and condition the crop material for windrow drying in the sun. In the case of straw, an agricultural combine discharges non-grain crop material from the rear of the combine defining the straw (such as wheat or oat straw) which is to be picked up by the baler. The cut crop material is typically raked and dried, and a baler, such as a large square baler or round baler, straddles the windrows and travels along the windrows to pick up the crop material and form it into bales.

A round baler may generally include a chassis, supported by wheels, a pickup unit to engage and lift the crop material into the baler, a cutting unit, a bale chamber for forming a bale, and a wrapping mechanism for wrapping or tying a material around the bale after it has been formed in the main bale chamber. As the baler is towed over a windrow, the pickup unit lifts the crop material into the baler. Then, the crop material may be cut into smaller pieces by the cutting unit. As the crop material enters the bale chamber, multiple carrier elements, e.g. rollers, chains and slats, and/or belts, will begin to roll a bale of hay within the chamber. These carrier elements are movable so that the chamber can initially contract and subsequently expand to maintain an appropriate amount of pressure on the periphery of the bale. After the bale is formed and wrapped by the wrapping mechanism, the rear of the baler is configured to open for allowing the bale to be discharged onto the field.

In the case of a variable round baler, the bale chamber may include belts for forming the bale. The belts stay in contact with the bale to assist in forming and densifying the bale. If one or more of the belts loses tension, mistracking of the belt(s) can occur and detrimentally affect subsequent bale formation.

What is needed in the art is a way to reduce the risk of belts in the bale chamber from mistracking.

SUMMARY OF THE INVENTION

Exemplary embodiments provided according to the present disclosure include tensioning arms that is configured to reduce slack in one or more belts of a bale chamber when a serpentine arm is lifted by one or more of the belts.

In some exemplary embodiments provided in accordance with the present disclosure, a bale chamber for an agricultural baler includes a plurality of rolls; a plurality of belts wrapped around the rolls; a movable serpentine arm in contact with the belts and configured to move responsively to lifting by at least one of the belts; and a plurality of tensioning arms, each of the tensioning arms being forced against a respective one of the belts and independently movable relative to the other tensioning arms. Each tensioning arm is configured to move against and reduce slack in its respective belt as the serpentine arm moves out of contact with its respective belt.

In some exemplary embodiments provided in accordance with the present disclosure, an agricultural baler, includes: a chassis; a pickup including a plurality of tines and configured to pick up crop material from a field; and a bale chamber carried by the chassis and configured to receive crop material from the pickup. The bale chamber includes: a plurality of rolls; a plurality of belts wrapped around the rolls; a movable serpentine arm in contact with the belts and configured to move responsively to lifting by at least one of the belts; and a plurality of tensioning arms, each of the tensioning arms being forced against a respective one of the belts and independently movable relative to the other tensioning arms. Each tensioning arm is configured to move against and reduce slack in its respective belt as the serpentine arm moves out of contact with its respective belt.

One possible advantage that may be realized by exemplary embodiments provided according to the present disclosure is that the tensioning arms can each reduce slack in any belts that are not lifting the serpentine arm to reduce the risk of mistracking.

Another possible advantage that may be realized by exemplary embodiments provided according to the present disclosure is that the tensioning arms are independently movable to reduce the risk of uneven crop material feeding into the bale chamber causing mistracking of one or more belts.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "forward", "rearward", "left" and "right", when used in connection with the agricultural baler and/or components thereof are usually determined with reference to the direction of forward operative travel of the towing vehicle, but they should not be construed as limiting. The terms "longitudinal" and "transverse" are determined with reference to the fore-and-aft direction of the towing vehicle and are equally not to be construed as limiting.

Figure 1:
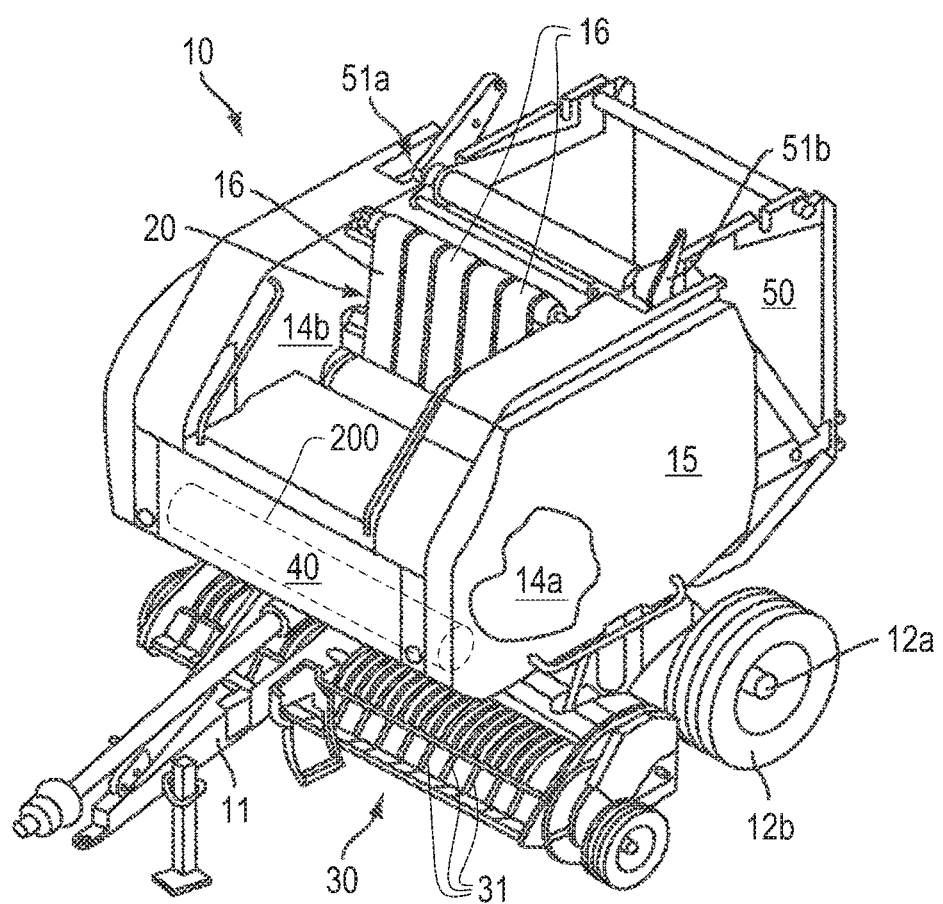
FIG. 1 illustrates a perspective view of an exemplary embodiment of an agricultural baler including a bale chamber, provided in accordance with the present disclosure.

Referring now to the drawings, and more particularly to FIG. 1, an exemplary embodiment of an agricultural baler 10 provided according to the present disclosure is illustrated in the form of a variable chamber round baler. The baler 10 includes a chassis terminating forwardly in a tongue 11 and rearward slightly beyond a transverse axle 12a to which a pair of wheels 12b (only one shown) is mounted, thus forming a wheel supported chassis. The chassis supports a series of belts 16 and floor rolls, which together with a first sidewall 14a (shown in the breakout) behind and generally parallel to a cover panel 15 and a second sidewall 14b, collectively forming a portion of a bale chamber 20. It should be appreciated that while three belts 16 are illustrated and described herein, the baler 10 may include more or fewer than three belts. Further, it should be appreciated that the "belts" 16 described herein may also refers to chains or other similar elements. Cut crop material is picked up by tines 31 of a transverse pickup 30 and fed into the bale chamber 20 where it is formed into a cylindrically shaped bale by the series of belts 16. The bale is then optionally wrapped with twine or a net wrapping material dispensed from a wrapping mechanism generally behind shield 40. Upon completion of the optional wrapping process, the tailgate 50 pivots upwardly about pivot points 51a, 51b and the bale is discharged onto the ground.

Figure 2:
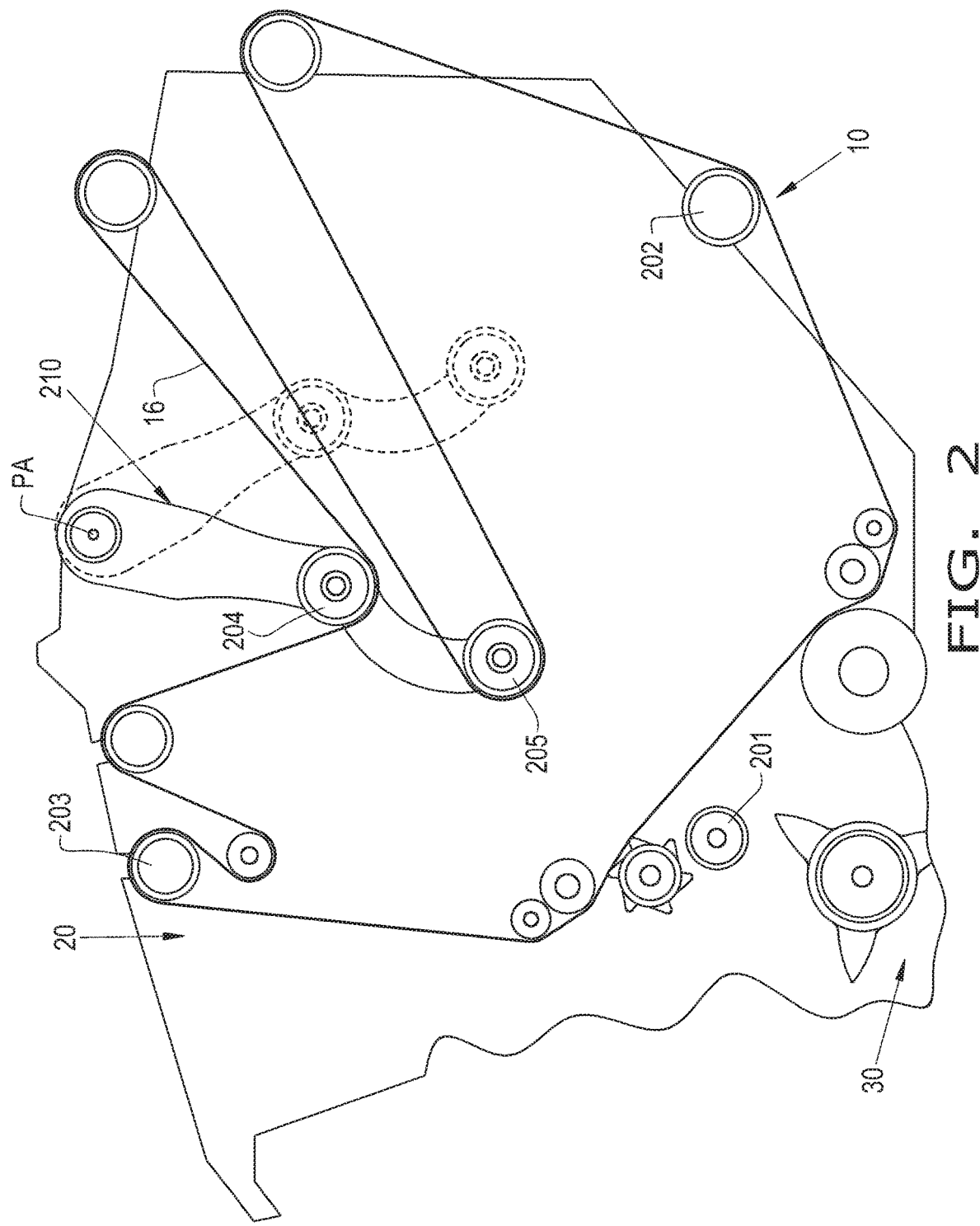
FIG. 2 illustrates a sectional view of the agricultural baler of FIG. 1.
Figure 3:
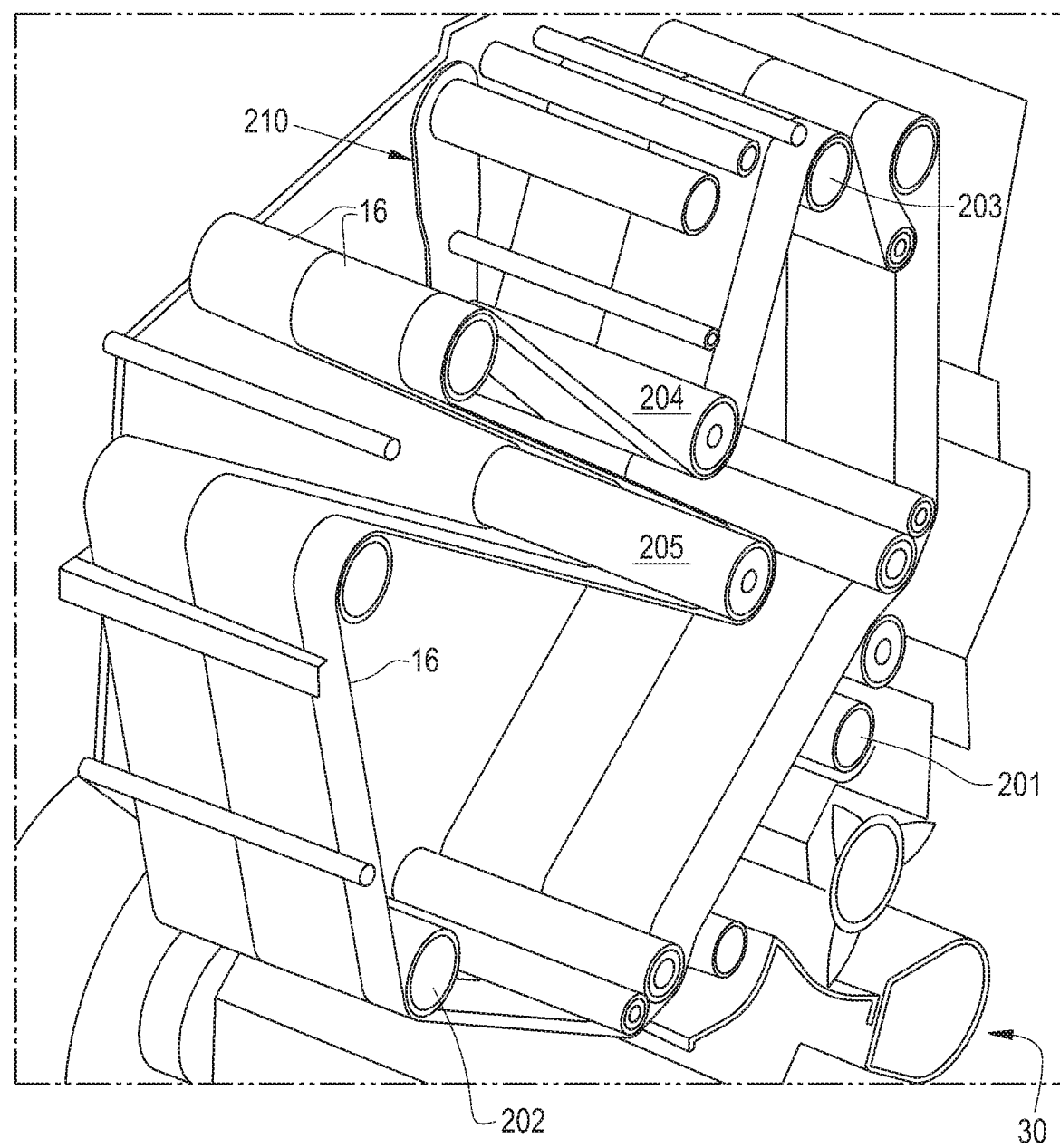
FIG. 3 illustrates another sectional view of the agricultural baler of FIGS. 1-2.

Referring now to FIG. 2, a sectional view of the baler 10 is illustrated. As can be seen, the belts 16 wrap around a plurality of rolls 201, 202, 203, 204, 205 placed throughout the bale chamber 20. One of the rolls 201 may be a starter roll that rotates when coupled to a mechanical power source by a power take-off. The rolls 202 and 203 may be guide rolls that help guide the belts 16 within the bale chamber 20. Rolls 204 and 205 may be rolls that are formed as part of a movable serpentine arm 210, which is in contact with the belts 16 to keep the belts 16 taut. It should be appreciated that while the arm 210 is described herein as a "serpentine arm," the arm 210 does not need to have a serpentine shape and the term "serpentine arm" is commonly used in the art to describe such an arm regardless of the shape. The serpentine arm 210 is in contact with the belts 16 and configured to move responsively to lifting by one or more of the belts 16. The belts 16 may lift on the serpentine arm 210 as the size of a forming bale grows. As the bale size grows, one or more of the belts 16 may lift on the serpentine arm 210 to move the serpentine arm 210, as illustrated in dashed lines. The serpentine arm 210 maintains contact with one or more of the belts 16 during movement to maintain tension in the contacted belt(s) 16 and reduce the risk of one or more belts 16 losing tension and mistracking.

In known balers, the serpentine arm can be lifted by movement of only some of the belts. When the baler is collecting crop material from narrow windrows and/or is not correctly centered, one side of the forming bale may expand at a greater rate than the other. This uneven expansion can cause one of the belts to lift the serpentine arm, due to the growing size of the portion of the bale contacting the belt, while one or more of the other belts do not lift the serpentine arm, and thus come out of contact with the serpentine arm, because the portion of the bale contacting those belts has not expanded. This unevenness occurs most frequently when the core of the bale begins to form. The belts that do not contact the serpentine arm can thus take on slack, which makes the slacked belts prone to mistracking as well as introducing crop material between the slacked belts.

Figure 4:
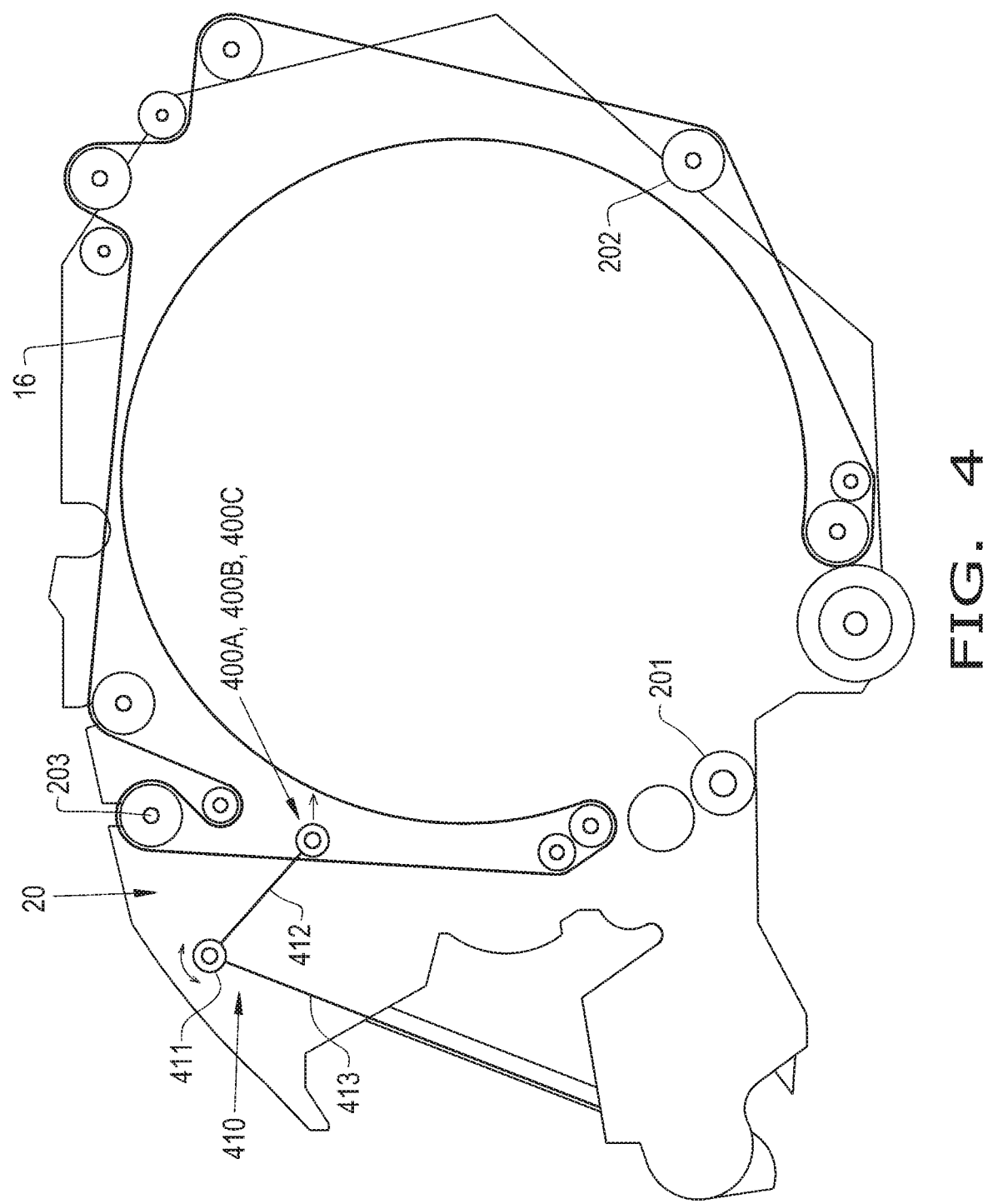
FIG. 4 illustrates a sectional view of the agricultural baler of FIGS. 1-3 showing an exemplary embodiment of a tensioning arm and a tensioning assembly provided according to the present disclosure when all belts of the bale chamber are in contact with a serpentine arm, which is omitted from view for ease of illustration.

To address some of the previously described issues, and referring now to FIGS. 4 and 5A-5C, the bale chamber 20 provided according to the present disclosure includes a plurality of tensioning arms 400A, 400B, 400C that are each forced against a respective one of the belts 16 and independently movable relative to the other tensioning arms 400A, 400B, 400C. For ease of illustration, only one of the tensioning arms 400A is illustrated in FIG. 4. It should be appreciated that all of the tensioning arms 400A, 400B, 400C described herein may be configured and operate similarly to one another. Further, all of the tensioning arms 400A, 400B, 400C may be placed close to one another in the bale chamber 20, as illustrated, or, alternatively, the tensioning arms 400A, 400B, 400C can be spread throughout the bale chamber 20.

Figure 5A:
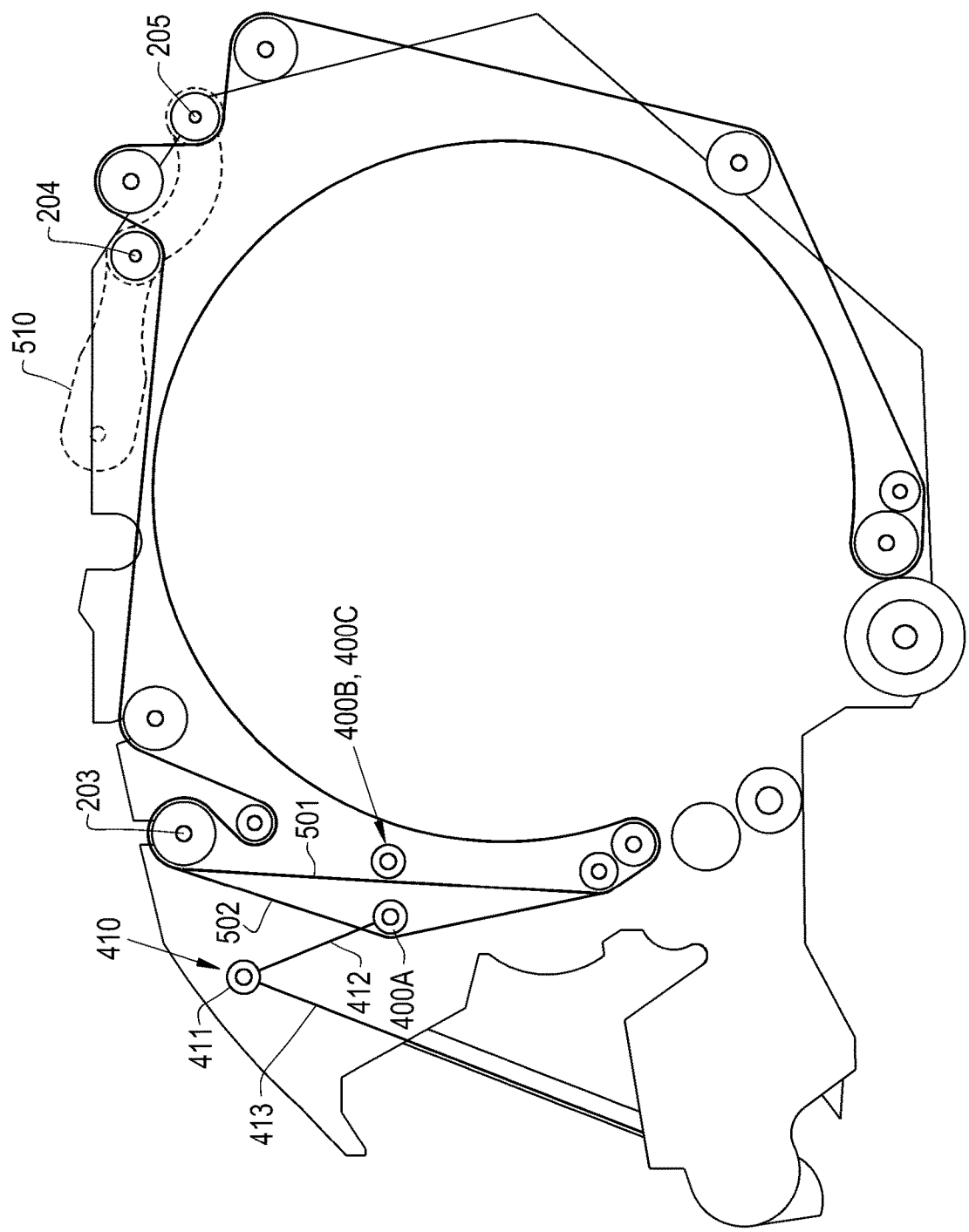
FIG. 5A illustrates a sectional view of the agricultural baler of FIGS. 1-4 when one of the tensioning arms has moved against its respective belt to reduce slack in the belt, which has come out of contact with the serpentine arm.
Figure 5B:
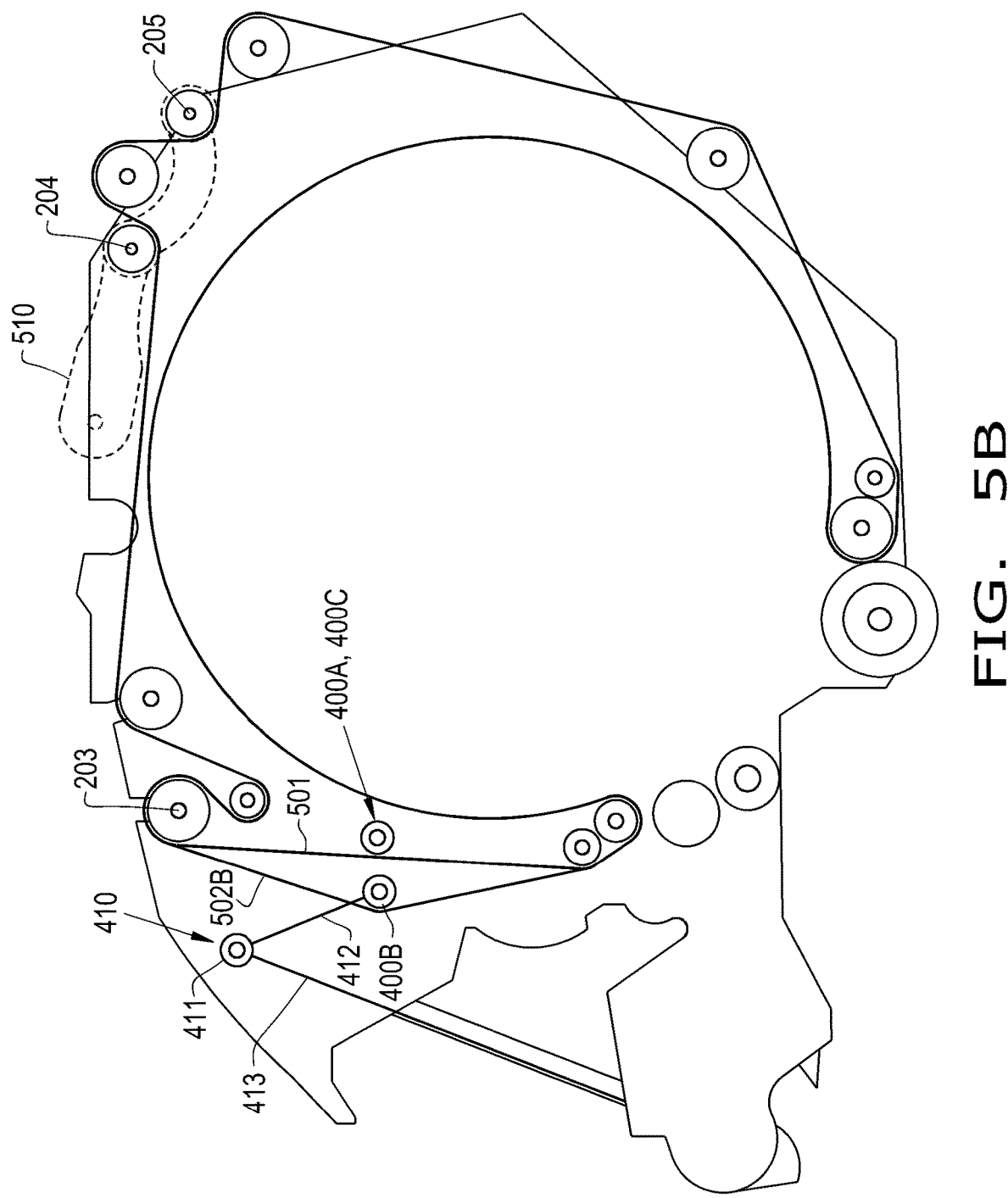
FIG. 5B illustrates a sectional view of the agricultural baler of FIGS. 1-5A when another one of the tensioning arms has moved against its respective belt to reduce slack in the belt, which has come out of contact with the serpentine arm.
Figure 5C:
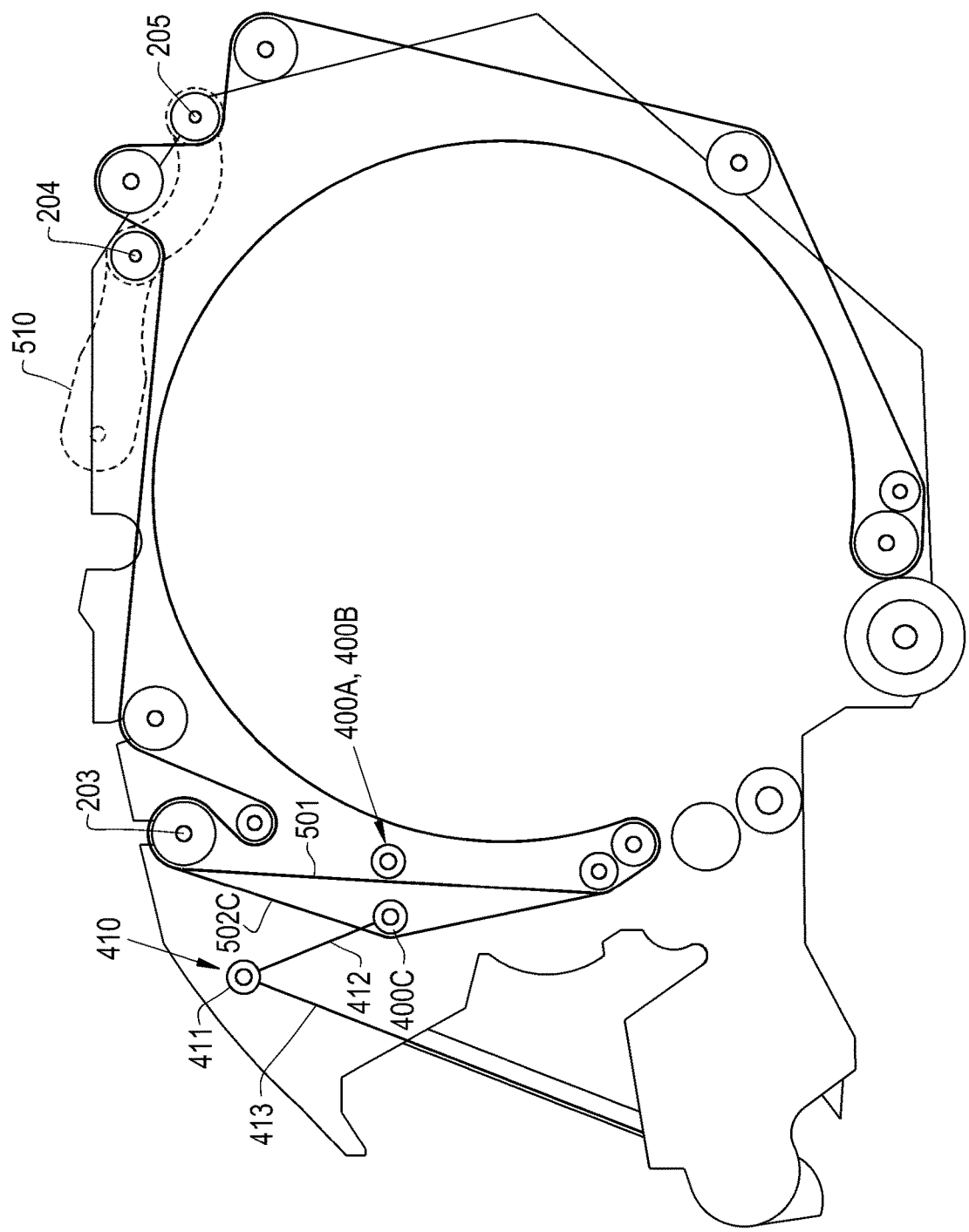
FIG. 5C illustrates a sectional view of the agricultural baler of FIGS. 1-5B when yet another one of the tensioning arms has moved against its respective belt to reduce slack in the belt, which has come out of contact with the serpentine arm.

Each tensioning arm 400A, 400B, 400C is configured to move against and reduce slack in its respective belt 16 as the serpentine arm 210 moves out of contact with its respective belt 16, which may be due to one or more of the other belts 16 asymmetrically lifting the serpentine arm 210 as the bale expands in a non-uniform manner. It is illustrated in FIG. 5A how one or more of the belts, designated as belt 501 in FIG. 5, stays in contact with the lifted serpentine arm 510 while another one of the belts, designated as belt 502 in FIG. 5A, has come out of contact with the serpentine arm 510 and become slacked. The tensioning arm 400A, by virtue of being forced against the belt 502, moves against the belt 502 to reduce slack in the belt 502, maintaining tension in the belt 502 and reducing the risk of the belt 502 becoming mistracked. The tensioning arms 400B, 400C, on the other hand, stay in place and do not move because their respective belts 501 have stayed in contact with the serpentine arm 510 and have not become slacked. FIG. 5B illustrates when another one of the belts, designated as belt 502B, has come out of contact with the serpentine arm 510 and become slacked, with the respective tensioning arm 400B moving against the belt 502B to reduce slack in the belt 502B while the other tensioning arms 400A, 400C do not move. FIG. 5C illustrates when yet another one of the belts, designated as belt 502C, has come out of contact with the serpentine arm 510 and become slacked, with the respective tensioning arm 400C moving against the belt 502C to reduce slack in the belt 502C while the other tensioning arms 400A, 400B do not move. In this respect, each of the tensioning arms 400A, 400B, 400C is movable independently of the other tensioning arms 400A, 400B, 400C.

In some embodiments, one or more of the tensioning arms 400A, 400B, 400C is forced against its respective belt 16 by a respective tensioning assembly 410. The tensioning assembly 410 may include a tensioning roll 411 and a tensioner 412 coupled to the tensioning arm 400A, 400B, 400C and the tensioning roll 411. The tensioner 412 may be, for example, a chain or other type of element that keeps tension in the tensioning arm 400A, 400B, 400C. To provide the tension to the tensioning arm 400A, 400B, 400C via the tensioner 412, a spring 413 may be coupled to the tensioning roll 411. The tensioning roll 411 may be rotatable, as indicated by the arrow in FIG. 4, so the tensioning roll 411 rotates to move the tensioning arm 400A, 400B, 400C against its respective belt 16 when the belt 16 slacks due to coming out of contact with the serpentine arm 210. The force for rotating the tensioning roll 411 may be provided by the spring 413 pulling on the tensioning roll 411. Conversely, the tensioning roll 411 may rotate to allow movement of the tensioning arm 400A, 400B, 400C as its respective belt 16 moves during expansion of the bale to keep the tensioning arm 400A, 400B, 400C in contact with its respective belt 16. When the serpentine arm 210 is configured to move rearwardly when lifted by at least one of the belts 16, as illustrated, the tensioning arms 400A, 400B, 400C may be disposed in front of the serpentine arm 210 so the tension from the tensioning assembly 410 acts in a direction opposite to the lifting movement of the belts 16 on the serpentine arm 210. It should thus be appreciated that the tensioning assembly 410 may maintain contact, and thus tension, between one or more of the tensioning arms 400A, 400B, 400C and its respective belt 16.

In some embodiments, the serpentine arm 210 is pivotable about a pivot axis PA and configured to pivot responsively to lifting by at least one of the belts 16, allowing the serpentine arm 210 to passively adjust to lifting by the belt(s) 16. It should be appreciated that the serpentine arm 210 can also be configured to move linearly and/or selectively, if desired. The serpentine arm 210 may include one or more rolls 204, 205, as previously described, which may be referred to as serpentine rolls and stay in contact with at least one of the belts 16 during operation.

In some embodiments, each of the tensioning arms 400A, 400B, 400C is configured to passively move against its respective belt 16 as the serpentine arm 210 moves out of contact with its respective belt 16. As used herein, "passive" movement of the tensioning arms 400A, 400B, 400C means that the tensioning arms 400A, 400B, 400C move automatically against their respective belts 16, i.e., movement of each tensioning arm 400A, 400B, 400C against its respective belt does not require activation.

In some embodiments, a number of tensioning arms 400 is equal to a number of belts 16. As illustrated, for example, the bale chamber 20 may include three belts 16 and thus three tensioning arms 400, with each tensioning arm 400 forced against one of the belts 16. Since the tensioning arms 400 are movable independently of one another, this allows each tensioning arm 400 to reduce slack in its respective belt 16, regardless of a position of the serpentine arm 210 or other belts 16, to reduce the risk of mistracking of the belt 16 or crop material making its way in between or behind the belts 16.

From the foregoing, it should be appreciated that the tensioning arms 400 provided according to the present disclosure independently maintain tension in each of the belts 16 to reduce slack in the belts 16 when the serpentine arm 210 is not lifted by all of the belts 16. The tensioning arms 400 reducing slack in the belts 16 can reduce the risk of the belts 16 becoming mistracked and detrimentally affecting baling. Further, the tensioning arms 400 can be kept in contact with the belts 16 by tensioning assemblies 410 that include relatively few parts and are thus cost-effective to incorporate in the baler 10. It should thus be appreciated that the tensioning arms 400 provided according to the present disclosure represent an effective and economic solution to reducing the risk of slack in the belts 16 during operation.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

The invention claimed is:

1. A bale chamber for an agricultural baler, comprising:
   a plurality of rolls;
   a plurality of belts wrapped around the rolls;
   a movable serpentine arm in contact with the belts and configured to move responsively to lifting of the serpentine arm by any one of the belts; and
   a plurality of tensioning arms, each of the tensioning arms being forced against a respective one of the belts and independently movable relative to the other tensioning arms, each tensioning arm being configured to move against and reduce slack in its respective belt as the serpentine arm moves out of contact with its respective belt, wherein the serpentine arm is configured to move rearwardly toward a direction of ejection of a bale when lifted by at least one of the belts, and wherein the tensioning arms are disposed in front of the serpentine arm at a position further from the direction of ejection of the bale than a position of the serpentine arm.

2. The bale chamber of claim 1, wherein at least one of the tensioning arms is forced against its respective belt by a respective tensioning assembly, the respective tensioning assembly comprising a tensioning roll and a tensioner coupled to the tensioning arm and the tensioning roll.

3. The bale chamber of claim 2, wherein the respective tensioning assembly comprises a spring coupled to the tensioning roll.

4. The bale chamber of claim 1, wherein the serpentine arm is pivotable and configured to pivot responsively to lifting by at least one of the belts.

5. The bale chamber of claim 1, wherein the serpentine arm comprises a plurality of serpentine rolls in contact with the belts.

6. The bale chamber of claim 1, wherein each of the tensioning arms is configured to passively move against and reduce slack in its respective belt as the serpentine arm moves out of contact with its respective belt.

7. The bale chamber of claim 1, wherein a number of tensioning arms is equal to a number of belts.

8. An agricultural baler, comprising:
   a chassis;
   a pickup comprising a plurality of tines and configured to pick up crop material from a field; and
   a bale chamber carried by the chassis and configured to receive crop material from the pickup, the bale chamber comprising:
   a plurality of rolls;
   a plurality of belts wrapped around the rolls;
   a movable serpentine arm in contact with the belts and configured to move responsively to lifting of the serpentine arm by any one of the belts; and
   a plurality of tensioning arms, each of the tensioning arms being forced against a respective one of the belts and independently movable relative to the other tensioning arms, each tensioning arm being configured to move against and reduce slack in its respective belt as the serpentine arm moves out of contact with its respective belt, wherein the serpentine arm is configured to move rearwardly toward a direction of ejection of a bale when lifted by at least one of the belts, and wherein the tensioning arms are disposed in front of the serpentine arm at a position further from the direction of ejection of the bale than a position of the serpentine arm.

9. The baler of claim 8, wherein at least one of the tensioning arms is forced against its respective belt by a respective tensioning assembly, the respective tensioning assembly comprising a tensioning roll and a tensioner coupled to the tensioning arm and the tensioning roll.

10. The baler of claim 9, wherein the respective tensioning assembly comprises a spring coupled to the tensioning roll.

11. The baler of claim 8, wherein the serpentine arm is pivotable and configured to pivot responsively to lifting by at least one of the belts.

12. The baler of claim 8, wherein the serpentine arm comprises a plurality of serpentine rolls in contact with the belts.

13. The baler of claim 8, wherein each of the tensioning arms is configured to passively move against and reduce slack in its respective belt as the serpentine arm moves out of contact with its respective belt.

14. The baler of claim 8, wherein a number of tensioning arms is equal to a number of belts.

\* \* \* \* \*